United States Patent

[11] 3,630,714

[72] Inventor Roy C. De Selms
 Rochester, N.Y.
[21] Appl. No. 719,254
[22] Filed Apr. 5, 1968
[45] Patented Dec. 28, 1971
[73] Assignee Chevron Research Company
 San Francisco, Calif.
 Continuation-in-part of application Ser. No.
 510,677, Nov. 30, 1965, now abandoned.
 This application Apr. 5, 1968, Ser. No.
 719,254

[54] METHOD FOR CONTROLLING UNDESIRABLE VEGETATION USING 2-NITRO-3-PYRIDOLS OR THEIR SALTS OR ESTERS
 7 Claims, No Drawings

[52] U.S. Cl. .................................................. 71/94,
 71/90, 260/270 R, 260/294.8 D, 260/294.8 E,
 260/294.8 F, 260/295 R, 260/297 R, 424/245,
 424/263
[51] Int. Cl. ..................................................... A01n 9/14,
 A01n 9/22, C07d 31/24
[50] Field of Search ............................................ 71/94, 90

[56] References Cited
 UNITED STATES PATENTS
 3,547,935 12/1970 Diehl et al. .................. 260/297
 3,132,019 5/1964 Soper ............................ 71/94
 3,234,228 2/1966 Johnston et al. ............. 260/294.8
 3,249,419 5/1966 Martin .......................... 71/66
 3,249,619 5/1966 Johnston ...................... 260/295
 3,376,307 4/1968 Hyden et al. ................. 260/294.3
 3,470,172 9/1969 Kaufman ...................... 260/247.5
 3,495,969 2/1970 Driscoll ........................ 71/94

Primary Examiner—Lewis Gotts
Assistant Examiner—Melvyn Kassenoff
Attorneys—A. L. Snow, Frank E. Johnston and G. F. Magdeburger ABSTRACT: Preemergence control of weed grasses and broad-leaved weeds using compounds of the formula

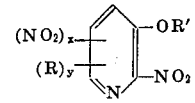

wherein $x$ is 0 or 1, R is lower alkyl, F, Cl or Br, $y$ is 0, 1, 2 or 3 and R' is hydrogen, a positive salt-forming group or an organic ester group such as carboxyacyl, sulfonyl, carbamyl, carbonate or thiocarbonate.

METHOD FOR CONTROLLING UNDESIRABLE VEGETATION USING 2-NITRO-3-PYRIDOLS OR THEIR SALTS OR ESTERS

CROSS REFERENCE TO RELATED APPLICATIONS

This application is a continuation-in-part of copending application Ser. No. 510,677 filed Nov. 30, 1965 now abandoned.

FIELD OF INVENTION

This invention pertains to new selective preemergence methods for preventing the growth of undesired vegetation using certain 3-pyridols or their salts or esters.

Although a great many compounds have been developed for use in controlling undesirable vegetation, the problem of effectively eliminating such vegetation is still very prevalent. Hence, the search for new and more efficient herbicidal compounds is of great importance. The most efficient herbicide is a selective one. A preemergence herbicide of this type will kill seed, germinating seed and seedlings of unwanted vegetation but do no harm to desirable vegetation growing in the same area.

INVENTION DESCRIPTION

It has now been found that 3-pyridols having one to two nuclear nitro substituents, one of which is in the 2-position of the pyridol nucleus, and zero to three nuclear substituents selected from the group consisting of lower alkyl and halogen of atomic number 9 to 35 and the salts and esters of such pyridols exhibit a high degree of selective preemergence herbicidal activity at low concentrations.

The 3-pyridols and the salts and esters thereof which are the active ingredients in the methods of this invention are represented by the formula:

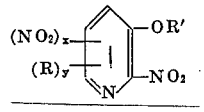

wherein R is lower alkyl (one to six carbon atoms) such as methyl, ethyl and propyl or halogen of atomic number 9 to 35, i.e., fluorine, chlorine and bromine, $x$ is 0 or 1, $y$ is 0 or an integer in the range of 1 and 3, inclusive, and R' is hydrogen or either an organic ester group or positive salt-forming group. Preferred compounds are 2-nitro-3-pyridol and its salt and ester derivatives ($x$ and $y$ in the above formula are 0).

The following exemplify compounds of the above formula in the case of R' being hydrogen: 2-nitro-3-pyridol, 2,4-dinitro-3-pyridol, 2,5-dinitro-3-pyridol, 2,6-dinitro-3-pyridol, 4-methyl-2-nitro-3-pyridol, 5-methyl-2-nitro-3-pyridol, 6-ethyl-2-nitro-3-pyridol, 5-propyl-2,4-dinitro-3-pyridol, 4,5-dimethyl-2-nitro-3-pyridol, 5-propyl-2,4-dinitro-3-pyridol, 4,5-dimethyl-2-nitro-3-pyridol, 5-ethyl-4-methyl-2-nitro-3-pyridol, 4,5-dimethyl-2,6-dinitro-3-pyridol, 4-chloro-2-nitro-3-pyridol, 5-bromo-2-nitro-3-pyridol and 5-fluoro-2-nitro-3-pyridol.

As indicated above, R' may be a positive salt-forming group. Upon dissociation these salts convert to their corresponding 3-pyridols. Such dissociation will usually happen when the salt is applied to the plant environment. The positive salt-forming group is not essential to the general activity of the pyridolic compounds of this invention, but may provide unique means for special application or formulation and enhanced selectivity in some instances.

The 2-nitro-3-pyridates (those compounds where R' represents a salt-forming group) include alkaline earth metal, alkali metal and ammonium salts. In the case of the ammonium compounds, spectroscopic evidence indicates a degree of complexing. The term "salt" as used herein includes such complexes. For these pyridates, R' in the above formula represents an alkaline earth metal cation such as $Mg^{++}$, $Ca^{++}$, $Mg(OH)^+$, etc., an alkali metal cation such as $Li^+$, $Na^+$ and $K^+$ or an ammonium group. The ammonium group may be substituted with from zero to three aliphatic groups, alicyclic groups or aromatic groups. These substituents will usually have up to about 10 carbon atoms and may be substituted with halo or hydroxyl groups. Aliphatic groups include alkyl such as methyl, ethyl, isopropyl, butyl, hexyl, octyl, 3-hydroxypropyl, 3-hydroxyhexyl, 2-chloroethyl, 3-bromobutyl, propenyl, butenyl and the like. The alicyclic agroups will usually be saturated. They are exemplified by cyclohexyl, cyclobutyl, cyclooctyl and cyclopropyl. The aromatic groups will usually be mononuclear such as phenyl, benzyl, tolyl, cumyl, xylyl, p-chlorophenyl and the like.

Examples of these pyridates are calcium di(2,4-dinitro-3-pyridate), barium di(2-nitro-3-pyridate), hydroxy calcium 4-methyl-2,6-dinitro-3-pyridate, magnesium di(5-chloro-2-nitro3-pyridate), lithium 2-nitro13-pyridate, sodium 2-nitro-3-pyridate, sodium 5,6-dimethyl-2-nitro-3-pyridate, sodium 5,6-dimethyl-2,4-dinitro-3-pyridate, potassium 2-nitro-3-pyridate, methylammonium 6-fluoro-2-nitro-3-pyridate, octylammonium 6-methyl-2-nitro-3-pyridate, p-chlorophenylammonium 2-nitro-3-pyridate, dimethylammonium 2-nitro-3-pyridate, dihexylammonium 2-nitro-3-pyridate, diphenylammonium 2-nitro-3-pyridate, trimethylammonium 2-nitro-3-pyridate, triethanolammonium 2-nitro-3-pyridate, etc.

As indicated above, R' may be an organic ester group. These esters will usually hydrolyze to their corresponding 3-pyridols when they are applied to the plant environment. As with the above-described salts, these ester groups are not essential to the general activity of the pyridolic compounds but may provide means for special application or formulation.

These organic ester groups may vary widely. They usually will contain one to about 20 carbon atoms and be a carboxyacyl, sulfonyl, carbamyl, carbonate or thiocarbonate group.

In the carbonic acid, carboxylic acid and carbamic acid esters the oxygen bound to the pyridine nucleus is bound to a carbonyl group. R' in these esters represent radicals of the formula

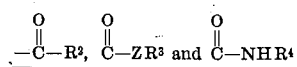

$R^2$ contains one to about 15 carbon atoms, usually one to 10 carbon atoms and may be aliphatic hydrocarbyl, e.g., alkyl and alkenyl, halo- or nitro-substituted aliphatic hydrocarbyl, alicyclic, e.g., cycloalkyl and cycloalkenyl, aryl (usually monocyclic), halo- or nitro-substituted aryl, aryloxyalkyl, haloaryloxyalkyl or a heterocyclic group having a single O or S heteroatom. Z is oxygen or sulfur, preferably oxygen. $R^3$ contains one to about 15 carbon atoms, usually one to 10 carbon atoms, and is a hydrocarbyl group, e.g., alkyl, alkenyl, cycloalkyl, cycloalkenyl and aryl (usually monocyclic) or a halo- or nitro-substituted hydrocarbyl group of the above description. $R^4$ contains one to eight carbon atoms and is hydrocarbyl, e.g., alkyl, alkenyl, cycloalkyl, cycloalkenyl and aryl (usually monocyclic) or a halo- or nitro-substituted hydrocarbyl group of the above description. The halo groups which may be present in $R^2$, $R^3$ and $R^4$ are desirably of atomic number 17 to 35; that is Cl and Br.

Examples of R' groups having a carbonyl bound to the nuclear oxygen of the pyridol are: acetyl, butryl, octanoyl, dodecanoyl, cyclohexanoyl, cyclobutanoyl, cyclohexenoyl, acrylyl, crotonyl, bromoacetyl, trichloroacetyl, 2,2-dichloropropanoyl, 4-nitrobutanoyl, 4-chlorocyclohexanoyl, toluoyl, benzoyl, thienylcarbonyl, furoyl, nitrobenzoyl, chlorobenzoyl, naphthoyl, methoxycarbonyl, ethoxycarbonyl, hexoxycarbonyl, phenoxycarbonyl, p-chlorophenoxycarbonyl, 2,4-dichlorophenoxycarbonyl, p-nitrophenoxycarbonyl, phenylthiocarbonyl, ethylthiocarbonyl, cyclohexylthiocarbonyl, carbamyl, N-methylcarbamyl, N-propylcarbamyl, N-cyclohexylcarbamyl, N-chloroethylcarbamyl, N-phenylcarbamyl, N-p-bromophenylcarbamyl and the like.

In the sulfonate esters R' represents a radical of the formula

in which $R^5$ has one to about 10 carbon atoms and is hydrocarbyl such as alkyl, alkenyl, aryl (usually monocyclic) and cycloalkyl or halohydrocarbyl wherein the hydrocarbyl is as defined above and the halogen is of atomic number 17 to 35. Examples of such sulfonate groups are ethanesulfonyl, hexanesulfonyl, octanesulfonyl, cyclohexanesulfonyl, benzenesulfonyl, toluenesulfonyl and the like.

Pyridol compounds included in this invention may be prepared by reacting 3-pyridol, an alkyl-3-pyridol or a halo-3-pyridol with a strong nitrating agent such as nitric acid, mixtures of nitric and sulfuric acids and nitrates soluble in sulfuric acid in an acidic anhydrous dehydrating medium such as concentrated sulfuric or phosphoric acid.

The nitration of the pyridol compounds will take place at temperatures between about $-5°$ and $100°$ C. More usually, it will take place at $0°$ to $50°$ C. The pressure employed in the reaction is not critical. For convenience, atmospheric or autogenous pressure will be used. The mol ratio of pyridol to nitrating agent will usually be 0.5:1 to 1.5:1. For best results stoichiometric proportions will be used.

The salts and esters of the 3-pyridols of this invention are prepared by methods well known in the art. The 3-pyridols act as Lewis acids in making the salts. They act as alcohols when the esters are prepared.

For preparing metal salts, one may use metal alkoxides. For ammonium salts, ammonium hydroxides or amines as such may find use.

Acyl halides are especially useful to make the esters.

EXAMPLES

The following examples are offered to illustrate methods by which some of the active ingredients of the compositions and methods of this invention may be prepared. These examples are presented for illustration only and are not to be taken as limiting the invention described herein.

EXAMPLE 1

A reaction vessel, fitted with a stirrer and cooled in an ice bath, was charged with 650 cc. concentrated sulfuric acid. With stirring, a 96 g.-portion of 3-pyridol was added in portions over a 15–20 minute period. During the addition the temperature was maintained at $20°$ to $30°$ C. A mixture of 92 mls. concentrated sulfuric acid and 48 mls. of 90 percent citric acid (sp. gr. 1.50) was then added dropwise at a rate such that the temperature of the reaction medium did not exceed $40°$ C. This addition took from 5 to 6 hours. The vessel was then allowed to stand at room temperature for about 16 hours after which the contents were poured, with stirring, into a vessel containing ice. With internal ice-cooling, 425 mls. of a 50 percent sodium hydroxide solution were added and a precipitate was formed. The mixture was extracted with ether and the extract dried over anhydrous magnesium sulfate. The ether was stripped off at subatmospheric pressure and the residue remaining sublimed at $50°–60°$ C., 1 mm. Hg, yielding 99 g. 2-nitro-3-pyridol. This product was observed as a pale yellow crystalline solid which melted at $67°–69°$ C.

EXAMPLE 2

Into a flask were charged 5.60 g. of the product of example 1 (2-nitro-3-pyridol), 100 mls. benzene and 3.22 mls. of pyridine. A 2.85 ml.-portion of acetyl chloride was gradually added to this mixture with stirring. Stirring was continued for an additional hour, after which the contents were filtered. The volatiles were stripped from the filtrate at subatmospheric pressure and the residue was distilled. A 5.39 g.-portion of 3-acetoxy-2-nitropyridine was obtained at $101°–107°$ C., 0.03–0.04 mm. Hg. The structure of this compound was verified by infrared and nuclear magnetic resonance analyses. Percent N:Calc.—15.38; Found—15.67.

EXAMPLE 3

Into a were charged a 7.00 g.-portion of 2-nitro-3-pyridol and 100 mls. of benzene. To this solution 6 g. of triethylamine were added dropwise with stirring. The mixture was then refluxed for 3 hours after which the volatile materials were stripped off at $50°–60°$ C., 0.4 mm. Hg. A yield of 6.00 g. of triethylammonium 2-nitro-3-pyridate was obtained. This compound was observed as a viscous, red oil. Its percent nitrogen analysis was: Calc.—17.45; Found—16.85.

EXAMPLE 4

Into a flask were charged a 7.00 g.-portion of 2-nitro-3-pyridol and 100 mls. absolute methanol. To this solution was added a solution of 2.70 g. sodium methoxide in 50 mls. methanol. The methanol was removed at subatmospheric pressure leaving 8.41 g. residue. The residue was dried at $60°$ C., 15 mm. Hg for 16 hours to give sodium 2-nitro-3-pyridate, a solid which melted at $300°$ C. with charring. Its nitrogen analysis was: percent Calc.—17.28; percent Found—15.69.

EXAMPLE 5

Into a flask was charged a 14.00 g.-portion of 2-nitro-3-pyridol in 50 mls. of chloroform. To this solution a 6.0 g.-portion of methyl isocyanate was added gradually. Three drops of pyridine were added as a catalyst and the mixture was allowed to stand with stirring at ambient temperature for 16 hours. The precipitate which has formed after this period was collected by filtration, washed with chloroform and dried at $50°$ C., 15 mm. Hg. A 13.5 g.-portion of 3-(methylcarbamyloxy)-2-nitropyridine was obtained. This compound was observed as a solid which melted at $132.5°–134.5°$ C. Its nitrogen analysis was: percent Calc.—21.3; percent Found—21.31.

These pyridolic compounds are used to inhibit the growth of undesirable vegetation by applying herbicidal (or growth controlling) quantities of them to the environment, e.g., soil, where such growth is not desired. Such application inhibits the growth of or kills the seeds, germinating seeds and seedlings. They are effective against wild grasses as well as broad-leaved weeds.

Preemergence herbicidal tests using representative pyridolic compounds were made according to the following procedure. The compound to be tested was dissolved in acetone and then diluted in water so that 80 mls. of solution per 2,000 g. soil would be equivalent to a drench of 5 parts of the herbicidal compound per million parts of dry soil. The soil was a homogeneous mix of moist topsoil and sand in a 1:1 volume ratio. Three replicate soil samples each having an adjusted dry weight[1]([1]Actual weight (g.) = 2,000+2,000(percent moisture)) of 2,000 g. were used for each test. Five hundred mls. of the soil of each replicate was set aside and the remainder was placed in a 9-inch long, 6-inch wide tray. The seeds of the vegetation were put in spaced rows across the width of each tray and covered with the 500 mls. soil previously set aside. The trays were lined up and 240 mls. of the herbicide formulation was sprinkled uniformly over them. The trays were then placed in a greenhouse, watered intermittently and observed for emergence of seedlings, health of emerging seedlings, etc. After 3 weeks the formulation was rated for herbicidal effectiveness based on the physiological observations.

The following table gives the results of this test in terms of percent control for various pyridols, pyridates and ester derivatives encompassed by this invention.

TABLE I

| Compound | Herbicidal effectiveness – percent control | | | | | | |
|---|---|---|---|---|---|---|---|
| | A | B | C | D | E | F | G |
| 2-nitro-3-pyridol | 68 | 75 | 100 | 97 | 100 | 100 | 100 |
| 3-acetoxy-2-nitropyridine | 97 | 57 | 83 | 91 | 88 | | |
| 6-methyl-2-nitro-3-pyridol | 66 | 52 | 59 | | 75 | | |
| 3-(4-chlorobenzoyloxy)-2-nitropyridine | | 14 | 53 | 12 | | 100 | 100 |
| 3-isobutyryloxy-2-nitropyridine | | 27 | 91 | 42 | 100 | 100 | 100 |
| 3-(p-chlorobenzenesulfonyloxy)-2-nitropyridine | | | 36 | 21 | 100 | 51 | 100 |
| 3-(2-furoyloxy)-2-nitropyridine | | 21 | 82 | 33 | 100 | 100 | 100 |
| 3-(methoxycarbonyloxy)-2-nitropyridine | | 52 | 91 | 66 | 88 | 88 | 97 |
| 2,6-dinitro-3-pyridol | | | 45 | 45 | | | 36 |
| Triethylammonium 2-nitro-3-pyridate | | 36 | 97 | 50 | 100 | 100 | 100 |
| Sodium 2-nitro-3-pyridate | | 47 | 97 | 80 | 86 | 100 | 100 |
| Ammonium 2-nitro-3-pyridate | | 48 | 100 | 79 | 82 | 97 | 100 |
| Triethanolammonium 2-nitro-3-pyridate | | 43 | 79 | 55 | 91 | 100 | 100 |
| Magnesium di(2-nitro-3-pyridate) | | 53 | 97 | 64 | 83 | 100 | 100 |
| 3-(p-chlorophenylcarbamyloxy)-2-nitropyridine | | | 92 | | 96 | 91 | 100 |
| 3-(cyclohexylcarbamyloxy)-2-nitropyridine | | | 82 | | 80 | 93 | 100 |
| 3-[methyl-(4-chloro-2-methylphenoxy)acetoxy]-2-nitropyridine | | | 99 | | 100 | 95 | 100 |
| 3-(2,4-dichlorophenoxyacetoxy)-2-nitropyridine | | | 100 | | 100 | 100 | 100 |
| Dimethylammonium 2-nitro-3-pyridate | | | 99 | | 99 | 99 | 100 |

NOTE.—A=Lambsquarter (*Chenopodium album*); B=Mustard (*Brassica arvensis*); C=Pigweed (*Stellaria media*); D=Ryegrass (*Lolium multiflorum*); E=Crabgrass (*Digitaria sanguinalis*); F=Watergrass (*Echinochloa crusgalli*); G=Bermudagrass (*Cynodon dactylon*).

The above described procedure was also used to show the selectivity of the preferred primary compound, 2-nitro-3-pyridol, on crop plants growing contiguously with undesirable vegetation. The following table gives the results at concentrations of 5, 2.5 and 1.25 p.p.m.

| Plant | 5 p.p.m. | % Control 2.5 p.p.m. | 1.25 p.p.m. |
|---|---|---|---|
| Bermudagrass | 100 | 100 | 100 |
| Crabgrass | 100 | 98 | 88 |
| Watergrass | 100 | 98 | 94 |
| Pigweed | 100 | 85 | 78 |
| Mustard | 75 | | 23 |
| Barley | 5 | 3 | 1 |
| Corn | 2 | 1 | 1 |
| Cotton | 1 | 1 | 3 |
| Pinto beans | 1 | 1 | 1 |
| Sugar beets | 47 | 11 | |
| Wheat | 39 | 19 | 5 |
| Alfalfa | 35 | 6 | 1 |

In general, the herbicidal compositions of this invention comprise one or more of the pyridolic compounds described herein admixed with a biologically inert carrier. Depending on the particular physical characteristics of the pyridolic compound(s), the carrier may be an inorganic solvent such as water, an organic solvent such as certain petroleum distillates or aromatic solvents or a solid such as dust, powder, clay or granules.

The proportion of pyridolic compound in agriculturally useful herbicidal compositions will normally comprise from 5 to 95 weight percent; whereas, the carriers will comprise 95 to 5 weight percent. A preferred composition comprises about 5–95 weight percent pyridolic compound and about 5–95 weight percent solid carrier. Particularly preferred compositions are granules comprising about 5–50 weight percent pyridolic compound and about 50–95 weight percent solid carrier.

For best results, the herbicidal compositions will also contain adjuvants such as a wetting or dispersing agent to facilitate their penetration into the soil media and plant tissue and generally enhance their effectiveness.

The compositions may also contain compatible fungicides, insecticides, nematocides, biocides and other herbicides and pesticides, as well as adjuvants, conditioners, fillers growth stimulators, plant hormones, and the like.

The amount of pyridolic compound administered will vary with the particular plants involved, plant growth medium which is to be contacted and the general location of application, i.e., sheltered areas such as greenhouses as compared to exposed areas such as fields. Normally dosages ranging from about 0.5 to 20 lbs. per acre will be used. Such administration will give a concentration of about 2 to 80 p.p.m. pyridolic compound distributed throughout 0.1 acre-foot.

In addition to herbicidal activity, pyridolic compounds of this invention has exhibited other biocidal activity such as fungicidal activity. For instance, compounds of this invention tests in vitro against *Pythium ultimum* and *Helminthosporium sativum* at a concentration of 500 p.p.m. gave the following results

IN VITRO FUNGICIDAL TESTING

| Compound | Percent control | |
|---|---|---|
| | Helminthosporium | Pythium |
| 2-nitro-3-pyridol | 100 | 100 |
| 6-methyl-2-nitro-3-pyridol | 78 | 94 |
| 3-acetoxy-2-nitropyridine | 98 | 100 |
| 3-(4-chlorobenzoyloxy)-2-nitropyridine | 100 | |
| 3-isobutyryloxy-2-nitropyridine | 100 | 100 |
| 3-(p-chlorophenylsulfonyloxy)-2-nitropyridine | 100 | 100 |
| 3-(2-furoyloxy)-2-nitropyridine | 100 | 100 |
| Magnesium di-(2-nitro-3-pyridate) | 100 | 98 |
| Triethanolammonium 2-nitro-3-pyridate | 100 | 100 |
| Triethylammonium 2-nitro-3-pyridate | 100 | 100 |
| Sodium 2-nitro-3-pyridate | 100 | 98 |

As will be evident to those skilled in the art, various modifications on this invention can be made or followed, in the light of the foregoing disclosure and discussion, without departing from the spirit or scope of the disclosure or from the scope of the following claims.

What is claimed is:

1. Method for inhibiting the growth of undesirable vegetation comprising applying to an environment where such growth is not desired a herbicidally effective amount of a compound of the formula

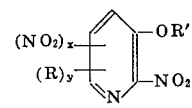

wherein $x$ is 0 or 1, R is lower alkyl or halogen of atomic number 9 to 35, $y$ is 0 or an integer in the range of 1 to 3, inclusive, and R' is H; 2 positive salt-forming group from the group consisting of alkaline earth metal cations, alkali metal cations and ammonium groups substituted with zero to three groups of up to 10 carbon atoms and selected from the group consisting of alkyl, alkenyl, cycloalkyl, phenyl, alkyl substituted phenyl, or halogen or hydroxyl substituted alkyl, alkenyl, cycloalkyl, phenyl or alkyl substituted phenyl; or an organic ester group of the formula

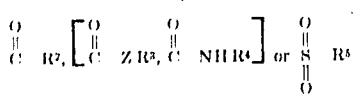

wherein $R^2$ contains one to about 15 carbon atoms and is thienyl; furoyl; hydrocarbyl selected from the group consisting of alkyl, alkenyl, cycloalkyl of three to 15 carbon atoms, cyclohexenyl phenyl, alkyl substituted phenyl or naphthyl; halo- or nitro-substituted hydrocarbyl selected from the group consisting of halogen or nitro-substituted alkyl, alkenyl, cycloalkyl, cyclohexenyl phenyl, alkyl substituted phenyl or naphthyl in which the halogen is chlorine or bromine; phenoxyalkyl; alkyl substituted phenoxy-alkyl; halo-substituted phenoxyalkyl or alkyl substituted phenoxyalkyl in which the halogen is chlorine or bromine; and $R^5$ has six to 10 carbon atoms and is phenyl or alkylphenyl or halo-substituted phenyl or halo-substituted alkylphenyl in which the halogen is chlorine or bromine.

2. The method of claim 1 wherein $x$ and $y$ are 0.

3. The method of claim 2 wherein R' is an alkaline earth metal cation, alkali metal cation or unsubstituted ammonium group.

4. The method of claim 2 wherein R' is H.

5. The method of claim 1 wherein $R^2$ has one to 10 carbon atoms.

6. The method of claim 1 wherein $x$ and $y$ are 0 and R' is acetyl, 4-chlorobenzoyl, isobutyryl, p-chlorobenzenesulfonyl, 2-furoyl, triethylammonium, sodium, ammonium, triethanolammonium, magnesium, 4-chloro-2-methylphenoxyacetyl or 2,4-dichlorophenoxyacetyl.

7. A method of inhibiting the growth of unwanted vegetation which comprises applying to an environment where said vegetation is unwanted a herbicidally effective amount of a compound of the formula

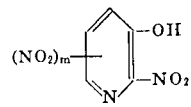

wherein $m$ is 0 or 1.